United States Patent [19]

Gramckow

[11] Patent Number: 4,492,172

[45] Date of Patent: Jan. 8, 1985

[54] METHOD AND APPARATUS FOR PRODUCING NON-RHIZOMING GRASSES

[76] Inventor: Jurgen Gramckow, 4096 Faria Rd., Ventura, Calif. 93001

[21] Appl. No.: 454,680

[22] Filed: Dec. 30, 1982

[51] Int. Cl.³ .............................................. A01C 5/00
[52] U.S. Cl. ...................................................... 111/1
[58] Field of Search .................................. 111/1, 8–14; 172/185, 537, 548, 550, 554; 47/1.43

[56] References Cited

U.S. PATENT DOCUMENTS 1,250,570  12/1917  Dunham ........................ 172/537 X
1,804,862  5/1931  Duncan et al. ................... 111/10 X

OTHER PUBLICATIONS (Author and date unknown) Ad Leaflet, "Brillion Turf-Maker & Landscape Seeders", Form 55-D, Litho in U.S.A. by Brillion Iron Works, Brillion, Wisconsin 54110.

Primary Examiner—James R. Feyrer
Attorney, Agent, or Firm—Ralph B. Pastoriza

[57] ABSTRACT

The method involves preparing seed beds in the form of parallel troughs of substantially closer spacing than used heretofore. Seeds for grass having non-rhizoming characteristics are planted in these troughs at a given rate to provide a substantially uniform seed density for all of the troughs. The close spacing of the troughs together with the seed density results in a sufficient plant competition as to force the growth upwardly thereby resulting in a greatly enhanced turf appearance over that which would result using conventional trough spacing and rhizoming grass. The controlled spacing between the adjacent troughs is accomplished by inserting serrated discs between successive flanged discs making up the front and rear rollers of a conventional seeding apparatus.

5 Claims, 5 Drawing Figures

METHOD AND APPARATUS FOR PRODUCING NON-RHIZOMING GRASSES

FIELD OF THE INVENTION

This invention relates generally to sod production and more particularly to a method and apparatus for producing non-rhizoming grasses.

BACKGROUND OF THE INVENTION

In the past, the mainstay of the sod industry has been Kentucky Bluegrass. Its greatest advantage from a sod grower's point of view is its rhizoming characteristic. In other words, it produces shallow underground shoots that upon surfacing produce another new plant. Rhizoming results in continuous lateral expansion from a "mother" plant to the point of eventually creating a very dense turf consisting of mother plants and their surrounding offspring.

Because of the foregoing characteristic and a desire to save seed costs, existing seeder devices were not designed to maximize plant density.

Relatively recently, completely different strains of grasses have been developed which have better water conserving and disease-resisting characteristics than Kentucky Bluegrass. These new kinds of grasses are known as improved perennial ryegrass and improved turf type tall fescue. Both the perennial rye and tall fescue do not produce rhizomes. The density of their turf is completely dependent upon original seed rate: that is, density, and uniformity of seed distribution: that is, spacing between longitudinal seed beds or troughs. In order to produce the best appearing sod possible, both factors are critical.

Seed rates are generally determined by each sod grower's individual parameters; for example, cost of seed, germination percentage, etc. Uniform seed distribution, in turn, is limited by the type of seeding device and the particular method of seeding. At the present time, the majority of sod growers use the Brillion "Turf Maker" seeder now available on the market. With this mechanism, seeds are planted in rows approximately two inches apart. If perennial rye or turf type tall fesque strains of grasses are to be grown, the resulting rows of plants do not grow together beyond their two inch spacing. The gap rather is filled by horizontal leaf growth, greatly detracting from the overall turf appearance.

BRIEF DESCRIPTION OF THE PRESENT INVENTION

The present invention has to do with a method and apparatus for producing non-rhizoming grasses in a manner to provide for a greatly enhanced turf appearance. Ideally, such enhanced appearance results from dense upright growth. In accord with the present invention, it has been discovered that this desired dense upright growth can only be achieved by creating enough plant competition to force the growth upward.

In its broadest aspects, the method of the invention contemplates the preparing of seed beds in the form of spaced parallel troughs; controlling the spacing between adjacent troughs to a value substantially less than the corresponding spacing provided for seeding grass having rhizoming characteristics; and planting seeds in the troughs at a given rate to provide a substantially uniform seed density for all troughs whereby sufficient plant competition is provided by said controlled spacing and seed density to force growth upwardly, thereby resulting in a greatly enhanced turf appearance over that which would result using conventional trough spacing and rhizoming grass.

The preferred apparatus for carrying out the method combines with a conventional seeder including front and rear rollers with flanged discs, additional serrated discs without flanges positioned between successive ones of the flanged discs so that the troughs formed by the apparatus within which grass seed is planted are spaced at approximately half the distance apart as would be the spacing in the absence of the serrated discs.

BRIEF DESCRIPTION OF THE DRAWINGS

A better understanding of this invention will be had by now referring to the accompanying drawings in which.

DETAILED DESCRIPTION OF THE INVENTION

Figure 1:
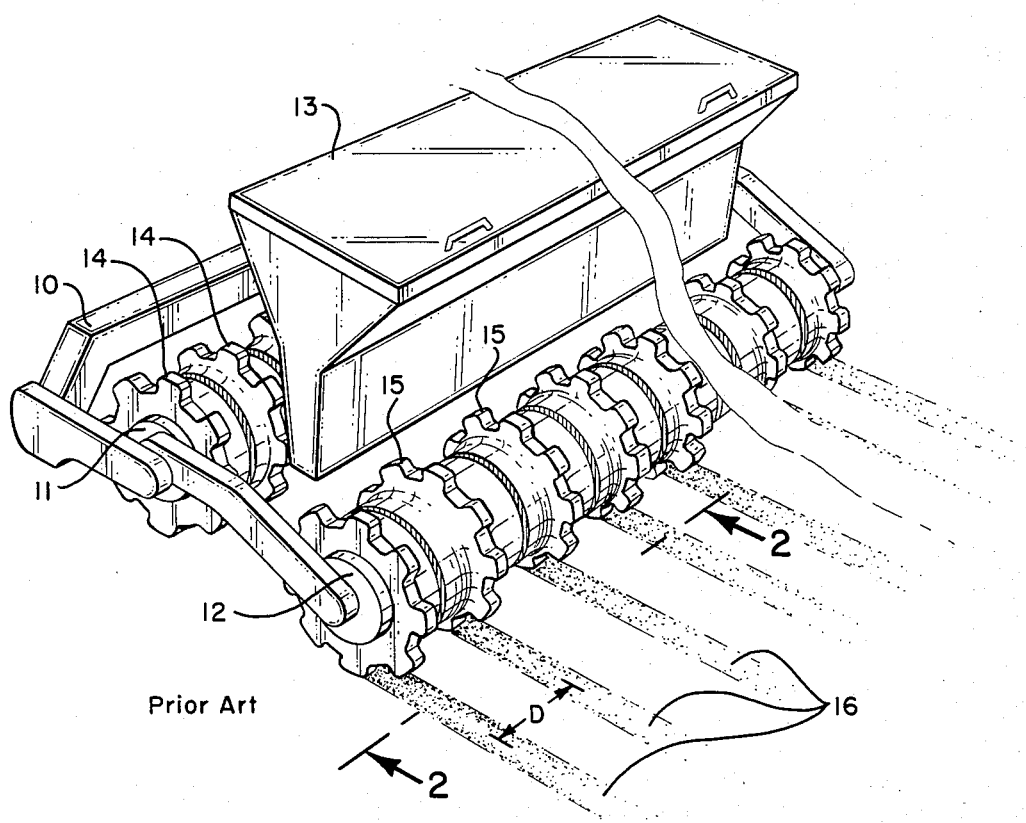
FIG. 1 is a perspective view of a conventional seeding apparatus capable of being easily modified to provide the improved apparatus of the present invention.

Referring first to FIG. 1, there is shown a conventional grass seeding apparatus comprising a frame 10 supporting front and rear rollers 11 and 12. A bin 13 is provided for holding grass seed and depositing the seed transversely between the front and rear rollers.

Each of the rollers is comprised of successive flanged discs such as indicated at 14 for the front roller 11 and 15 for the rear roller 12. Each flanged disc in turn is serrated such that the ground over which the apparatus 10 is moved will be worked to provide spaced parallel troughs such as indicated at 16 in FIG. 1. For planting of conventional Kentucky Bluegrass, the typical spacing between the troughs 16 indicated by the letter D might be two inches.

In conventional operation, the front roller 11 with its flanged serrated discs 14 will form troughs into which seeds from the bin 13 is dropped. The rear roller 12 and its flanged serrated discs 15 will function to work the dropped seeds into the ground. In other words, the front roller crushes lumps and presses down small stones to form a firm seed bed. The seed metered out from the bin 13 falls on the prepared seed bed and the rear roller will split the shallow ridges formed by the front rollers and gently firm the soil around the tiny seeds.

Figure 2:
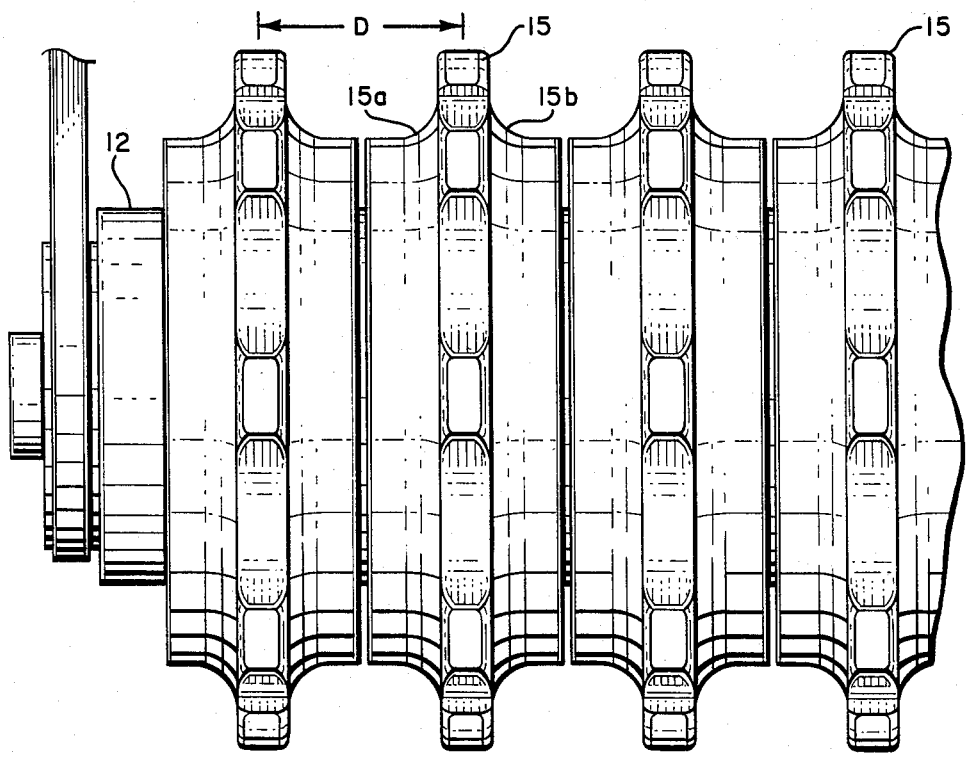
FIG. 2 is a fragmentary view looking in the direction of the arrows 2—2 of FIG. 1.

Referring to FIG. 2, the rear roller 12 is shown in fragmentary elevational view wherein the flanges for each of the serrated discs 15 are indicated at 15a and 15b. Essentially, the roller 12 serves as a journal for the flanged discs 15, the same being independently and freely rotatable.

As mentioned heretofore, with the recently introduced strains of grasses known as improved perennial ryegrass and improved turf type tall fescue, there is lacking the rhizoming characteristic. As a consequence, if seeds for these strains of grasses are planted with the equipment described in FIGS. 1 and 2, the rows of plants do not grow together beyond their two inch spacing. Rather, the gap is filled by horizontal leaf growth which greatly detracts from the overall turf appearance.

In accord with the method of the present invention as described briefly heretofore, seed beds are again formed in parallel troughs but the spacing between adjacent troughs is reduced to a value substantially less than the corresponding spacing provided for seeding grass having rhizoming characteristics. The perennial rye and tall fesque grass seeds can then be planted at a given rate to provide a substantially uniform seed density for all troughs. As a consequence, plant competition is provided by such spacing and seed density to force the growth upwardly, thereby resulting in a greatly enhanced turf appearance over that which would result using conventional trough spacing and rhizoming grass.

The step of controlling the spacing between adjacent troughs in accord with one embodiment of this invention can readily be accomplished by respectively inserting serrated flanged discs between the successive flanged discs 14 and 15 making up the front and rear rollers of the conventional seeding apparatus described in FIGS. 1 and 2. These serrated discs have the same diameter as the flanged discs.

Figure 3:
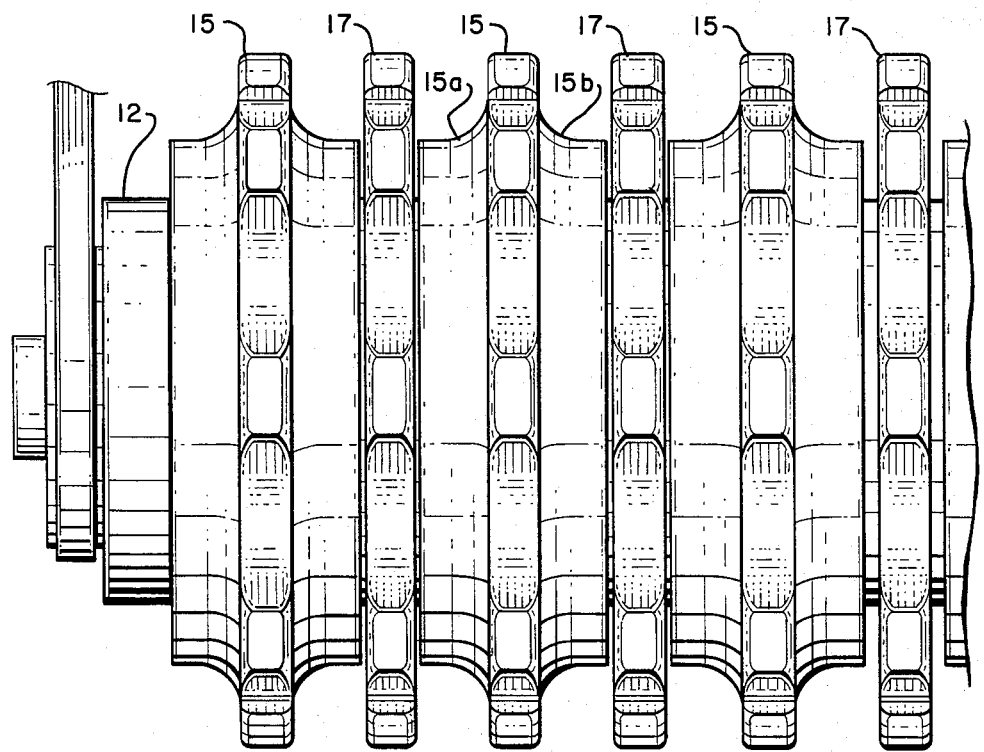
FIG. 3 is a view similar to FIG. 2, but showing the configuration after modification in accord with the method and apparatus of this invention.

FIG. 3 illustrates the appearance of the rear roller 12 after the serrated discs have been inserted as described, these discs being indicated at 17. As evident from FIG. 3, the discs 17 do not have flanges and may have a thickness T approximately one quarter of an inch. This thickness would correspond to the thickness of the serrated portion of the flanged discs 15.

As a consequence of utilizing the inserted serrated discs 17, the spacing between formed troughs or rows making up the seed beds is reduced to substantially one half the prior spacing described in FIG. 1.

Figure 4:
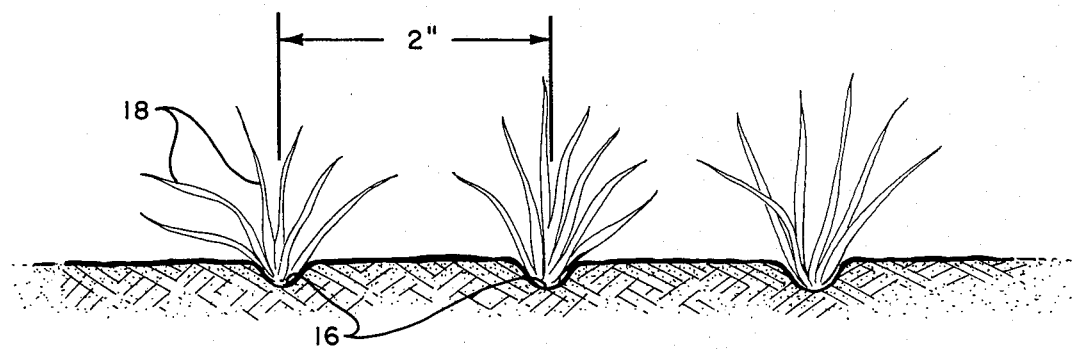
FIG. 4 is a cross section of a plurality of parallel troughs formed in accord with the conventional apparatus of FIG. 1.

FIG. 4 illustrates in cross section the seed bed troughs 16 of FIG. 1. Also illustrated at 18 is non-rhizoming grass growth wherein because of the two inch spacing, there does not appear an attractive overall turf appearance, there being less dense spaces between the rows.

Figure 5:
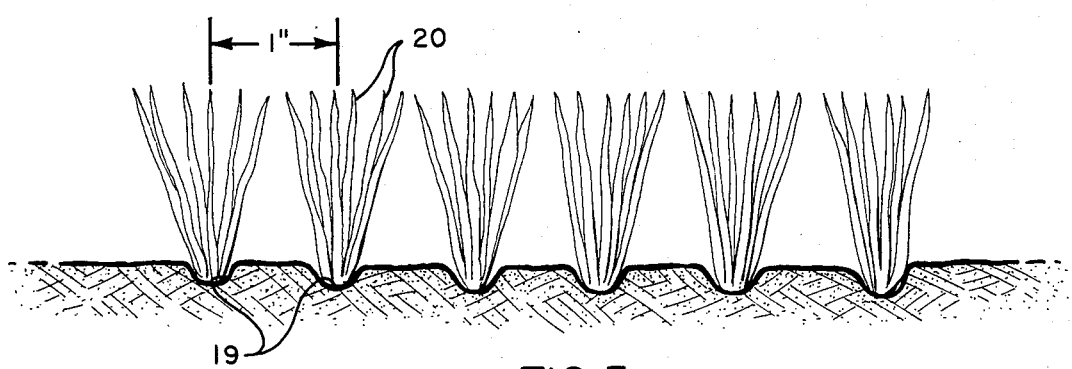
FIG. 5 is a view similar to FIG. 4, illustrating the trough and growth configuration in accord with a method and apparatus of the present invention.

FIG. 5 illustrates rows 19 resulting from use of the inserted serrated discs described in FIG. 3 in the front and rear rollers of the apparatus of FIG. 1. These troughs or rows of seed beds are spaced approximately one inch apart and as a consequence, sufficient plant growth competition is provided to force the growth of the non-rhizoming seeds upwardly as shown at 20. There thus results a greatly enhanced turf appearance over that which would result using conventional trough spacing and rhizoming grass wherein a reliance is placed on the rhizoming characteristic to fill in the spaces between the troughs.

From all of the foregoing, it will thus be evident that the present invention has resulted in an improved method and apparatus for producing non-rhizoming grasses wherein conventional seeding apparatus can be employed with only a slight modification easily carried out by a sod farmer himself.

While the preferred method of controlling the spacing between troughs involves inserting serrated discs between the flanged discs of a conventional seeder, a series of totally new discs could be provided for the machine with collars positioned therebetween of axial extent approximately half the axial spacing of the normal flanges, to provide the decreased spacing. Also, the serrated discs to be inserted in the described method can be formed from conventional flanged discs by cutting away the flanges although this process is somewhat time consuming and expensive.

Other means of controlling the spacing within the scope and spirit of the present method will occur to those skilled in the art. The invention accordingly is not to be thought of as limited to the specific embodiment set forth for illustrative purposes.

I claim:

1. A method of producing a higher than normal density non-rhizoming grass sod including the steps of:
    a. preparing seed beds in the form of spaced parallel troughs;
    b. reducing the spacing between adjacent troughs to a value substantially less than the corresponding spacing provided for seeding grasses having rhizoming and non-rhizoming characteristics; and
    c. planting seeds in said troughs at a normal rate to provide a substantially uniform seed density for all troughs whereby sufficient plant competition is provided by said spacing and seed density to force the growth upward, thereby resulting in a greatly enhanced turf appearance in a reduced period over that which would result using conventional trough spacing and the same seeding rate.

2. The method of claim 1, in which said spacing between adjacent troughs is reduced to approximately one inch and wherein said non-rhizoming grass constitutes turf type tall fescue.

3. The method of claim 1, in which said non-rhizoming grass constitutes improved perennial ryegrass.

4. The method of claim 1, in which the step of reducing the spacing between adjacent troughs includes the step of respectively inserting serrated discs between successive flanged discs making up the front and rear rollers of a conventional seeding apparatus, the serrated discs having the same diameter as the flanged discs.

5. In a seeding apparatus for providing non-rhizoming grass, including:
    front and rear rollers each having a plurality of side-by-side flanged serrated discs and seed dispensing means between said rollers, the improvement comprising:
    serrated discs without flanges positioned between successive ones of said flanged serrated discs so that troughs formed by said apparatus for receiving grass seed are spaced at approximately half the distance apart as would be the spacing in the absence of said serrated discs without flanges whereby sufficient plant competition is provided by the reduced trough spacing to force the growth upwardly thereby resulting in a greatly enhanced turf appearance over that which would result using only the flanged serrated discs to form the troughs and relying on the rhizoming characteristic of rhizoming grass to fill in the spaces between troughs.

* * * * *